United States Patent
Visweswariah et al.

(10) Patent No.: US 7,861,199 B2
(45) Date of Patent: Dec. 28, 2010

(54) METHOD AND APPARATUS FOR INCREMENTALLY COMPUTING CRITICALITY AND YIELD GRADIENT

(75) Inventors: Chandramouli Visweswariah, Croton-on-Hudson, NY (US); Jinjun Xiong, White Plains, NY (US); Vladimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 589 days.

(21) Appl. No.: 11/870,672

(22) Filed: Oct. 11, 2007

(65) Prior Publication Data

US 2009/0100393 A1    Apr. 16, 2009

(51) Int. Cl.
G06F 17/50 (2006.01)

(52) U.S. Cl. .......................................................... 716/6
(58) Field of Classification Search .................. None
See application file for complete search history.

(56) References Cited

U.S. PATENT DOCUMENTS

| | | | |
|---|---|---|---|
| 5,508,937 A | 4/1996 | Abato et al. | |
| 6,532,577 B1 | 3/2003 | Mbouombouo | |
| 6,950,996 B2 | 9/2005 | Alpert | |
| 7,000,205 B2 | 2/2006 | Devgan | |
| 7,086,023 B2 | 8/2006 | Visweswariah | |
| 7,096,443 B2 | 8/2006 | Berthold | |
| 7,111,260 B2 | 9/2006 | Visweswariah | |
| 7,133,819 B1 | 11/2006 | Hutton | |
| 7,280,939 B2 | 10/2007 | Hathaway | |
| 7,293,248 B2 | 11/2007 | Chang | |
| 7,320,118 B2* | 1/2008 | Homma et al. | 716/6 |
| 7,428,716 B2* | 9/2008 | Visweswariah | 716/6 |
| 7,437,697 B2* | 10/2008 | Venkateswaran et al. | 716/6 |
| 7,480,880 B2* | 1/2009 | Visweswariah et al. | 716/6 |
| 7,484,194 B2* | 1/2009 | Gregory et al. | 716/6 |
| 7,487,475 B1* | 2/2009 | Kriplani et al. | 716/4 |
| 7,487,486 B2* | 2/2009 | Celik et al. | 716/6 |
| 7,512,919 B2* | 3/2009 | Visweswariah | 716/6 |
| 2006/0277513 A1 | 12/2006 | Visweswariah | |
| 2007/0016881 A1 | 1/2007 | Gregory | |
| 2007/0074138 A1 | 3/2007 | Homma | |
| 2007/0143722 A1 | 6/2007 | Venkateswaran et al. | |
| 2007/0234252 A1 | 10/2007 | Visweswariah et al. | |

OTHER PUBLICATIONS

M.R. Guthaus, et al., "Gate Sizing Using Incremental Parameterized Statistical Timing Analysis", Computer-Aided Design, 2005, ICCAS-2005 IEEE/ACM International Conference, Nov. 6-10, 2005, pp. 1029-1036.

Anmol Mathur, et al., "Timing Driven Placement Reconfiguration for Fault Tolerance and Yield Enhancement in FPGAs", European Design and Test Conference, 1996, ED&TC 96, Mar. 11-14, 1996, copy consists of 5 unnumbered pages.

(Continued)

Primary Examiner—Leigh Marie Garbowski (57) ABSTRACT

In one embodiment, the invention is a method and apparatus for incrementally computing criticality and yield gradient. One embodiment of a method for computing a diagnostic metric for a circuit includes modeling the circuit as a timing graph, determining a chip slack for the circuit, determining a slack of at least one diagnostic entity, and computing a diagnostic metric relating to the diagnostic entity(ies) from the chip slack and the slack of the diagnostic entity(ies).

21 Claims, 7 Drawing Sheets

OTHER PUBLICATIONS

Azadeh Davoodi, et al., Variability Driven Gate Sizing for Binning Yield Optimization, ACM IEEE Proceedings of the 43rd Annual Conference on design Automation, Session 52, Logic and Sequential Synthesis, 2006, pp. 959-964.

Sarvesh Bhardwaj, et al., "Modeling of Intra-die Process Variations for Accurate Analysis and Optimization of Nano-scale Circuits", Annual ACM IEEE Design Automation Conferences, Proceedings of the 43rd Annual Conference on Design Automation Session 45, Design/Technology Interation, 2006, pp. 791-796.

Hongliang Chang, et al., "Statistical Timing Analysis Considering Spatial Correlations Using a Single Pert-Like Traversal", IEEE International Conference on Computer-Aided Design, Nov. 2003, San Jose, CA, pp. 621-625.

C. Visweswariah, et al., "First-Order Incremental Block-Based Statistical Timing Analysis", Proc. 2004 Design Automation Conference, Jun. 2004, San Diego, CA, pp. 331-336.

Aseem Agarwal, et al., Statistical Timing Analysis for Intra-Die Process Variations with Spatial Correlations, IEEE International Conference on Computer-Aided Design, Nov. 2003, San Jose, CA, pp. 900-907.

Lizheng Zhang, et al., "Block Based Statistical Timing Analysis with Extended Canonical Timing Model", Proc. Asia South Pacific Design Automation Conference (ASPDAC), Jan. 2005, Shanghai, China, pp. 250-253.

Jinjun Xiong, et al., "Criticality Computation in Parameterized Statistical Timing", Proc. 2006 Design Automation Conference, Jul. 2006, San Francisco, CA, pp. 63-38.

Aseem Agarwal, et al., "Circuit Optimization using Statistical Static Timing Analysis", Proc. 2005 Design Automation Conference, Jun. 2005, Anaheim, CA, pp. 321-324.

M.R. Guthaus, et al. "Gate Sizing Using Incremental Parameterized Statistical Timing Analysis", IEEE International Conference on Computer-Aided Design, Nov. 2005, San Jose, CA, pp. 1026-1033.

Xin Li, et al., "Defining Statistical Sensitivity for Timing Optimization of Logic Circuits with Large-Scale Process and Environment Variations", IEEE International Conference on Computer-Aided Design, Nov. 2005, San Jose, CA, pp. 843-851.

Kaviraj Chopra, et al., "Parametric Yield Maximization using Gate Sizing based on Efficient Statistical Power and Delay Gradient Computation", IEEE International Conference on Computer-Aided Design, Nov. 2005, San Jose, CA, pp. 1020-1025.

Vladimir Zolotov, et al., "Computation of Yield Gradients from Statistical Timing Analysis", Proc. 2006 TAU (ACM/IEEE Workshop on Timing Issues in the Specification and Synthesis of Digital Systems), Feb. 2006, San Jose, CA, copy consists of 6 unnumbered pages.

Jaskirat Singh, et al., "Statistical Timing Analysis with Correlated Non-Gaussian Parameters using Independent Component Analysis", In ACM/IEEE International Workshop on Timing Issues (TAU), Feb. 2006, San Jose, CA, pp. 155-160.

Lerong Cheng, et al., "Non-Linear Statistical Static Timing Analysis for Non-Gaussian Variation Sources", In ACM/IEEE International Workshop on Timing Issues (TAU), Feb. 2007, Austin, TX pp. 250-255.

Honglian Chang, et al., "Parameterized Block-Based Statistical Timing Analysis with Non-Gaussian Parameters, Nonlinear Functions", Proc. 2005 Design Automation Conference, Jun. 2005, Anaheim, CA, pp. 71-76.

Lizheng Zhang, et al., "Correlation-Preserved Non-Gaussian Statistical Timing Analysis with Quadratic Timing Model", In Proc. 2005 Design Automation Conference, Jun. 2005, Anaheim, CA, pp. 83-88.

Yaping Zhan, et al., "Correlation-Aware Statistical Timing Analysis with Non-Gaussian Delay Distributions", In Proc. Design Automation Conference, Jun. 2005, Anaheim, CA, pp. 77-82.

C.E. Clark, "The Greatest of a Finite Set of Random Variables", Operations Research, Mar.-Apr. 1961, pp. 145-162.

Debjit Sinha, et al., "Advances in Computation of the Maximum of a Set of Random Variables", Proc. IEEE International Symposium on Quality Electronic Design (ISQED), Mar. 2006, San Jose, CA, copy consists of 6 unnumbered pages.

* cited by examiner

METHOD AND APPARATUS FOR INCREMENTALLY COMPUTING CRITICALITY AND YIELD GRADIENT

BACKGROUND OF THE INVENTION

The present invention relates generally to design automation, and relates more particularly to statistical timing analysis.

As complementary metal-oxide-semiconductor (CMOS) technology continues to scale down to forty-five nanometers and beyond, process variation effects become increasingly important, and must be taken into account, for design closure. Statistical static timing analysis (SSTA) is commonly used in the timing of chip designs to account for these process variation effects.

Two important diagnostic metrics obtained from SSTA are criticality and yield gradient. Criticality and yield gradient provide valuable information that can be used to guide timing optimization and timing-driven physical synthesis. The computational intensity of conventional methods for computing criticality and yield gradient, however, render such methods inefficient for use in optimizing large circuits.

Thus, there is a need in the art for an efficient method and apparatus for computing criticality and yield gradient.

SUMMARY OF THE INVENTION

In one embodiment, the invention is a method and apparatus for incrementally computing criticality and yield gradient. One embodiment of a method for computing a diagnostic metric for a circuit includes modeling the circuit as a timing graph, determining a chip slack for the circuit, determining a slack of at least one diagnostic entity, and computing a diagnostic metric relating to the diagnostic entity(ies) from the chip slack and the slack of the diagnostic entity(ies).

BRIEF DESCRIPTION OF THE DRAWINGS

So that the manner in which the above recited features of the present invention can be understood in detail, a more particular description of the invention, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In one embodiment, the present invention is a method and apparatus for incrementally computing criticality and yield gradient. One embodiment of the invention represents the circuit as a directed acyclic timing graph, and then computes the criticality of nodes, edges, and paths of the timing graph (the term "diagnostic entity", as used herein, refers to a node, edge, or path of the timing graph). Further embodiments of the invention compute the gradient of the parametric yield of the circuit with respect to components of the delay of each diagnostic entity. Embodiments of the present invention compute criticality and yield gradient in an incremental manner, thereby minimizing the computational intensity of timing analyses.

Figure 1:
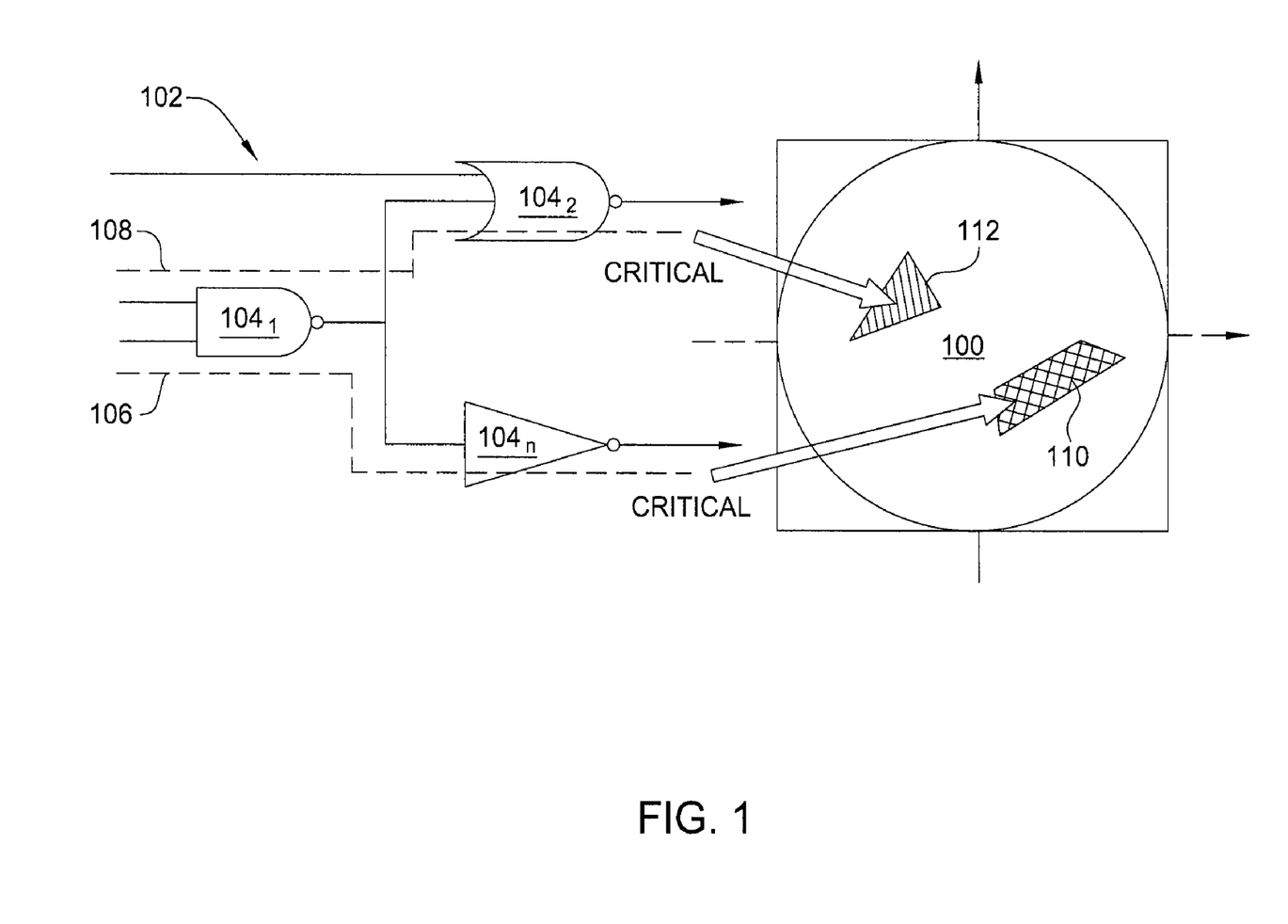
FIG. 1 is a schematic diagram illustrating the concept of "criticality", as used within the context of the present invention.

FIG. 1 is a schematic diagram illustrating the concept of "criticality", as used within the context of the present invention. Specifically, FIG. 1 illustrates a netlist 102 corresponding to a chip design manufactured in a two-dimensional space of manufacturing process parameters 100 (in general, the dimensionality could be higher). The chip netlist 102 includes a plurality of gates $104_1$-$104_n$ that form part of the chip. The "criticality" of a path is defined as the probability of manufacturing a chip in which the path is critical. Thus, within the context of the present invention, the term "criticality" is understood to refer to the probability of a node, edge, or path in a timing graph being on the critical path in a circuit (i.e., if one were to make one hundred chips, in how many of them would the node, edge, or path be critical?). Due to process variations, different paths are critical in different parts of the process space. Referring to FIG. 1, the path 108 is critical when the process "lands" in the region 112 in the process parameter space, and thus the criticality of the path 108 is the probability that the process parameters are in the region 112 after manufacturing. Likewise, the criticality of the path 106 is the probability that the process parameters are in the region 110 after manufacturing.

Figure 2:
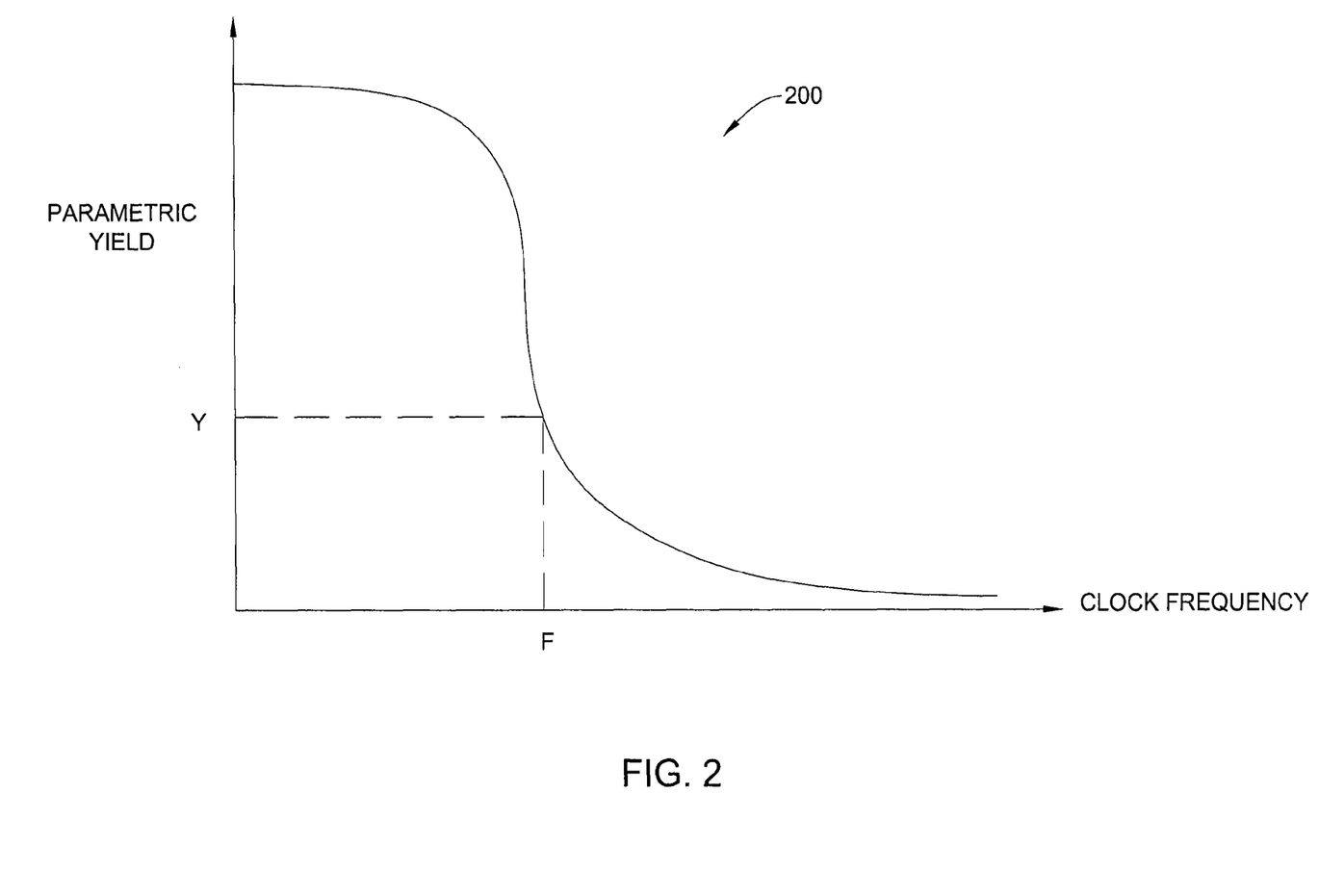
FIG. 2 is a graph illustrating the concept of "yield gradient", as used within the context of the present invention.

FIG. 2 is a graph 200 illustrating the concept of "yield gradient", as used within the context of the present invention. As illustrated, "yield gradient" relates the clock frequency (or speed) of a chip to the parametric yield (the fraction of chips that meet a given/required speed). F is the clock frequency of the chip at a given parametric yield, while Y is the parametric yield of the chip at a given frequency. The yield gradients then represent the sensitivity of the frequency, F, to the delay, $\bar{d}$, of a particular timing arc and the sensitivity of the parametric yield, Y, to the given delay $\bar{d}$. In statistical timing, delays are typically parameterized by the sources of variation, so $\bar{d}$ represents the vector $(d_0, d_1, \ldots, d_n, d_r)$, where $d_0$ is the mean of the statistical delay; $d_1, \ldots, d_n$ represent sensitivities of the delay to global sources of variation; and $d_r$ represents the independently random part. Those skilled in the art will appreciate that this can be extended to other parametric representations of statistical delays. These yield gradients may be expressed as:

$$\left(\frac{\partial F}{\partial \overline{d}}\right) \quad \text{(EQN. 1)}$$

and $$\left(\frac{\partial Y}{\partial \overline{d}}\right) \quad \text{(EQN. 2)}$$

where $$\left(\frac{\partial F}{\partial \overline{d}}\right) = \left(\frac{\partial F}{\partial d_0}, \frac{\partial F}{\partial d_1}, \cdots, \frac{\partial F}{\partial d_n}, \frac{\partial F}{\partial d_r}\right) \quad \text{(EQN. 3)}$$

Thus, within the context of the present invention, the term "yield gradient" is understood to refer to the sensitivity of parametric yield to the delay of a particular gate or wire in a chip design.

Figure 3:
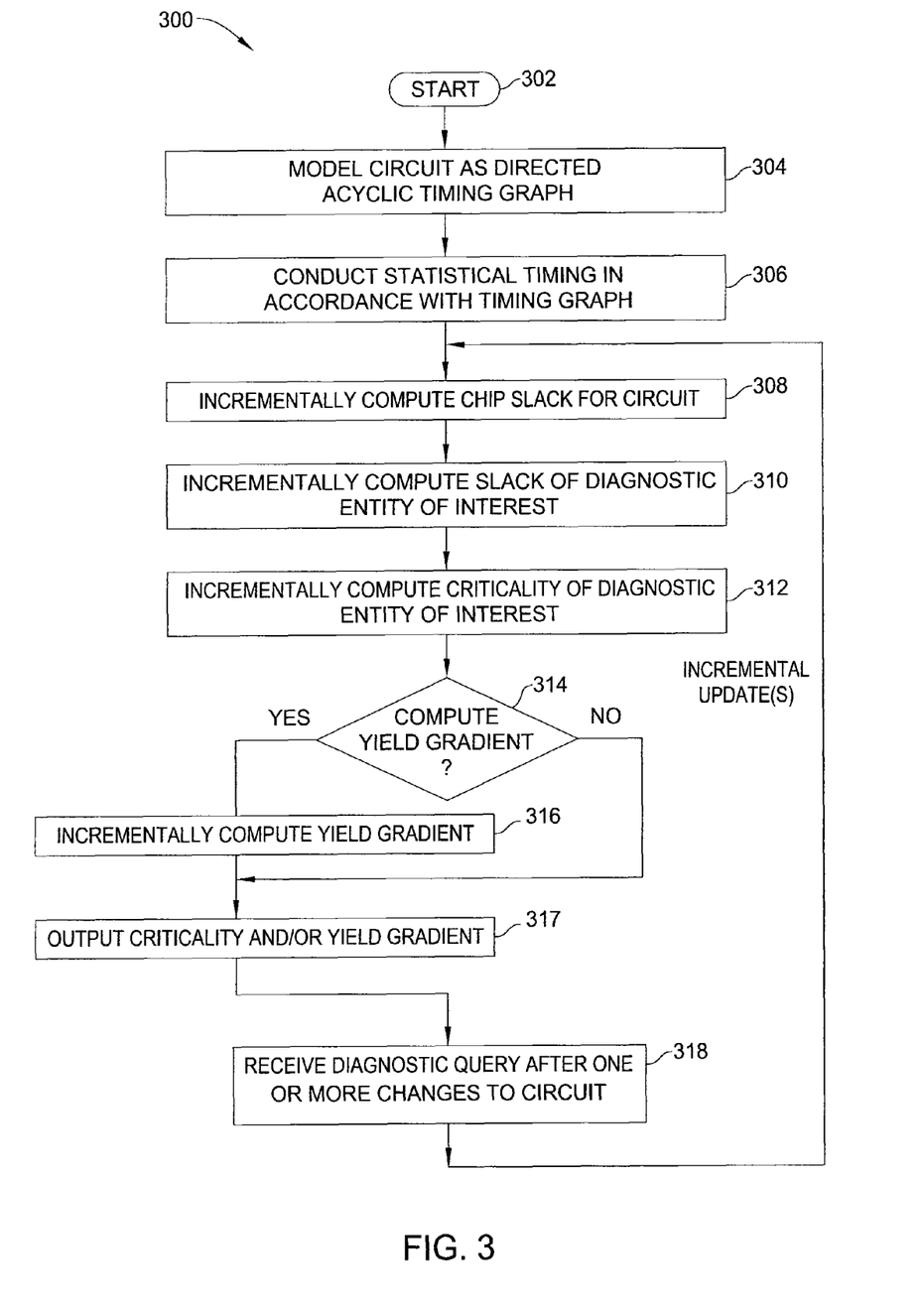
FIG. 3 is a flow diagram illustrating one embodiment of a method for computing the criticality and yield gradient of a given diagnostic entity, according to the present invention.

FIG. 3 is a flow diagram illustrating one embodiment of a method 300 for computing the criticality and yield gradient of a given diagnostic entity (e.g., node, edge, or path), according to the present invention.

The method 300 is initialized at step 302 and proceeds to step 304, where the method 300 models the circuit under analysis as a directed acyclic timing graph. The timing graph comprises a plurality of nodes (modeling the input and output pins of gates) and edges (modeling signal propagation through gates or wires) connecting the nodes. The weights of edges in the timing graph represent the edges' delays. In one embodiment, the timing graph is extended for convenience to include exactly one starting node (a "virtual source" connected to all primary inputs) and exactly one ending node (a "virtual sink" connected to all primary outputs and timing test points). All paths of the graph start at the virtual source and terminate at the virtual sink.

In step 306, the method 300 conducts statistical timing in accordance with the timing graph. Several quantities relating to the nodes in the circuit are produced as a result of the statistical timing. These quantities include, for each node, the arrival time (AT, i.e., maximum delay among all paths from the virtual source to the node) and the required arrival time (RAT, i.e., the negative of the maximum delay among all paths from the node to the virtual sink). As described in further detail below, this information allows one to determine the shortest and longest paths through the circuit from the virtual source to the virtual sink. Although step 306 is described within the context of late-mode timing, one of ordinary skill in the art will appreciate that the same methods may be applied to early-mode timing (wherein focus is on the fastest paths rather than the slowest paths).

In step 308, the method 300 computes the chip slack for the circuit. The chip slack is the maximum delay among all paths in the timing graph, or the arrival time of the timing graph's virtual sink. The circuit's chip slack, then, is limited by the longest path or paths through the timing graph. One embodiment of methods for computing chip slack is described in greater detail with reference to FIG. 4.

In step 310, the method 300 computes, for a given diagnostic entity (e.g., node, edge, or path) of interest, the slack. Embodiments of methods for computing node slack, edge slack, and path slack are described in greater detail with reference to FIGS. 5, 6, and 7.

In step 312, the method 300 uses the slacks computed in step 308 and 310 to compute the criticality of the diagnostic entity of interest. Embodiments of methods for computing criticality of diagnostic entities are described in greater detail with reference to FIGS. 8 and 9.

In step 314, the method 300 determines whether yield gradients are additionally required. If the method 300 concludes in step 314 that yield gradients are required, the method 300 proceeds to step 316 and computes the yield gradients. In one embodiment, the yield gradients are computed by differentiating the chip slack with respect to the delay parameters of the diagnostic entity of interest. Embodiments of methods for computing yield gradients for nodes, edges, and paths are described in greater detail below.

In step 317, the method 300 outputs the computed criticality and/or yield gradient.

In step 318, the method 300 receives a diagnostic query after one or more changes are made to the circuit under analysis. If the method 300 concludes in step 314 that yield gradients are not required, the method 300 skips step 316 and proceeds directly to step 317.

Once the diagnostic query is received, the changes to the circuit are detected, and the method 300 returns to step 308 and proceeds as described above, this time using the detected changes to incrementally update the chip slack (i.e., the method re-computes only what is necessary to answer the diagnostic query). In one embodiment, the chip slack is incrementally updated by incrementally updating the arrival time at the virtual sink, based on the detected changes. In one embodiment, the arrival time at the virtual sink is incrementally updated by block-based statistical static timing analysis.

Similarly, when the method 300 repeats step 310, the slack for the diagnostic entity of interest is incrementally updated based on the detected changes to the circuit. In one embodiment, the slack for the diagnostic entity of interest is incrementally updated by incrementally updating the arrival times and required arrival times for diagnostic entity of interest. In one embodiment, the arrival times and required arrival times associated with the diagnostic entity of interest are incrementally updated by block-based statistical static timing analysis.

When the method 300 repeats step 312, the method 300 recomputes the criticality of the diagnostic entity of interest, this time using the incrementally updated chip slack and diagnostic entity slack values computed in repeated steps 308 and 310. Yield gradients may be incrementally updated similarly by repeating step 316 using the updated information.

The method 300 thereby efficiently computes the criticalities and yield gradients of diagnostic entities by incrementally updating timing results after changes are made to the circuit. That is, only the timing results relating to the changed portions of the circuit are updated (rather than, e.g., the timing results for the entire circuit being updated).

Figure 4:
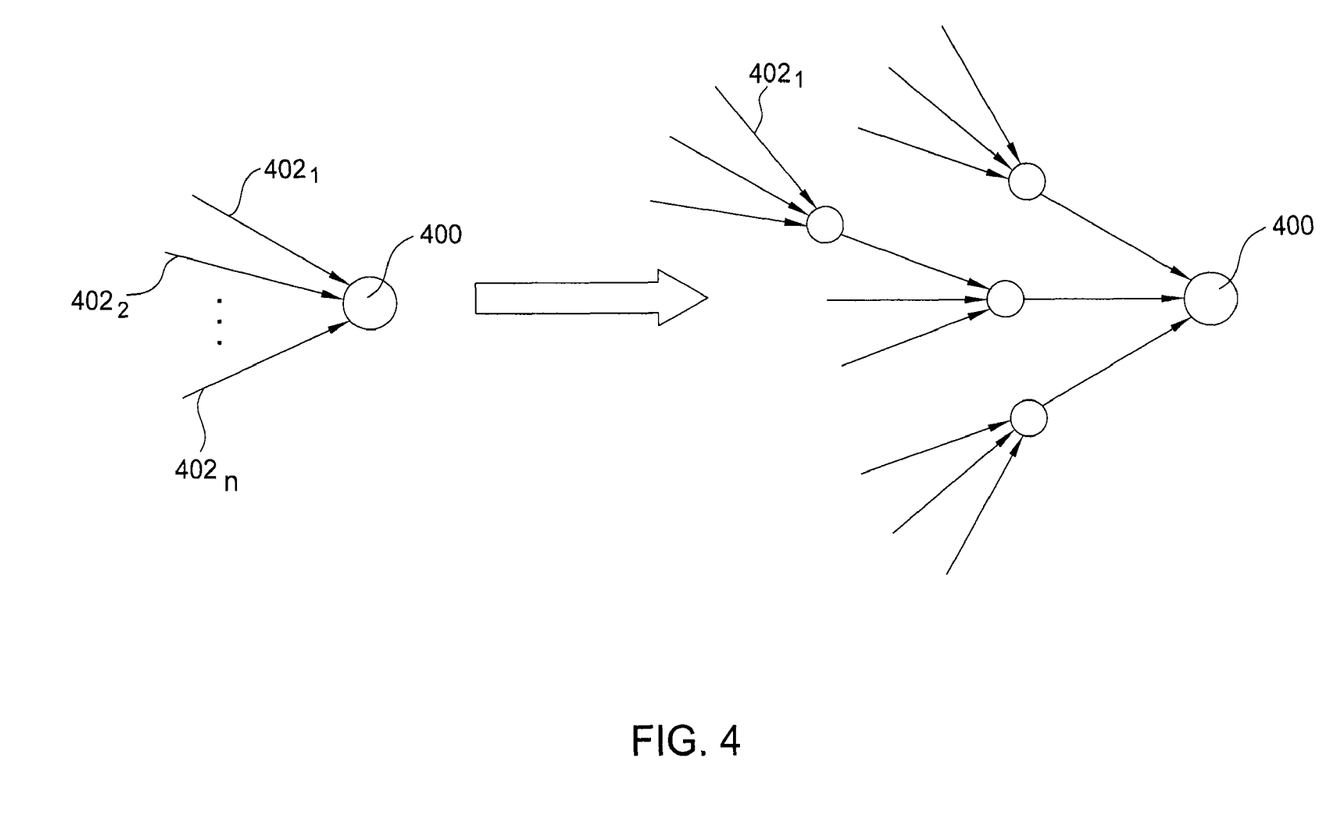
FIG. 4 is a schematic diagram illustrating one example of a method for computing the chip slack for a given chip, based on the chip's timing graph.

FIG. 4 is a schematic diagram illustrating one example of a method for computing the chip slack for a given chip, based on the chip's timing graph (e.g., in accordance with step 308 of the method 300). Specifically, FIG. 4 illustrates the virtual sink 400 of the chip's timing graph. The virtual sink is connected to a plurality of edges $402_1$-$402_n$ (hereinafter collectively referred to as "edges 402") from a plurality of nodes (not shown). For a large chip, there can be a very large number of edges. As further illustrated, the timing graph can be converted to a "tree-like" structure having the virtual sink 400 as its root. Edges 402 that converge at the virtual sink 400 may be grouped into sets by creating new nodes of the graph as shown in FIG. 4. This allows the arrival time at the virtual sink 400 (i.e., the chip slack) to be updated efficiently after a localized change in the circuit, since only a subset of the edges 402 will be processed with the tree structure (instead of all of the edges 402).

Figure 5:
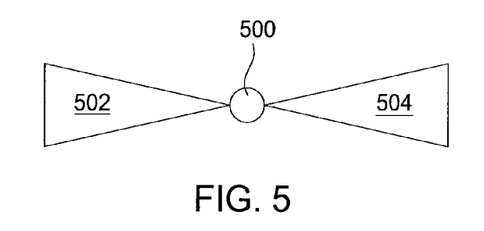
FIG. 5 is a schematic diagram illustrating one example of a method for computing the node slack for a given node in a timing graph.

FIG. 5 is a schematic diagram illustrating one example of a method for computing the node slack for a given node in a timing graph (e.g., in accordance with step 310 of the method 300). Specifically, FIG. 5 illustrates an arbitrary node 500, the fan-in cone 502 for the node 500, and the fan-out cone 504 for the node 500. As discussed above, the criticality of the node 500 is related to the node slack of the node 500, which is defined as the statistical maximum of all paths passing through the node 500. Node slack may be computed as the maximum delay among all paths in the fan-in cone 502 plus the maximum delay among all paths in the fan-out cone 504 (i.e., $AT_{500}-RAT_{500}$, both of which may be computed incrementally). Conversely, the node's "complement node slack" is defined as the maximum delay among all paths not through the node 500. As illustrated further in FIGS. 8 and 9, the complement node slack is not directly computed, since it is expensive to compute.

Figure 6:
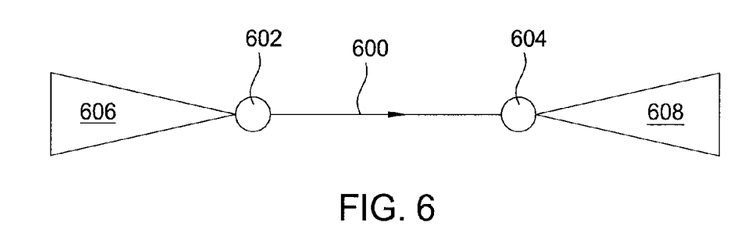
FIG. 6 is a schematic diagram illustrating one example of a method for computing the edge slack for a given edge in a timing graph.

FIG. 6 is a schematic diagram illustrating one example of a method for computing the edge slack for a given edge in a timing graph (e.g., in accordance with step 310 of the method 300). Specifically, FIG. 6 illustrates an arbitrary edge 600 connecting a source node 602 and a sink node 604, the fan-in cone 606 for the source node 602, and the fan-out cone 608 for the sink node 604. As discussed above, the criticality of the edge 600 is related to the edge slack of the edge 600, which is defined as the statistical maximum of all paths passing through the edge 600. Edge slack may be computed as the maximum delay among all paths in the fan-in cone 606 of the source node 602 plus the delay, d, of the edge 600 plus the maximum delay among all paths in the fan-out cone 608 of the sink node 604 (i.e., $AT_{602}+d_{600}-RAT_{604}$, all of which may be computed incrementally). Conversely, the edge's "complement edge slack" is defined as the maximum delay among all paths not through the edge 600. As illustrated further in FIGS. 8 and 9, the complement edge slack is not directly computed, since it is expensive to compute.

Figure 7:
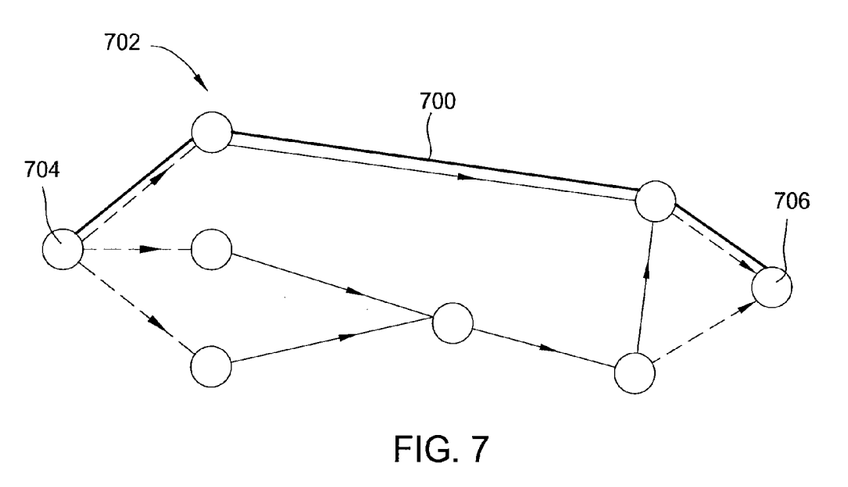
FIG. 7 is a schematic diagram illustrating one example of a method for computing the path slack for a given path in a timing graph.

FIG. 7 is a schematic diagram illustrating one example of a method for computing the path slack for a given path in a timing graph (e.g., in accordance with step 310 of the method 300). Specifically, FIG. 7 illustrates an arbitrary path 700 in a timing graph 702. As discussed above, the criticality of the path 700 is related to the path slack of the path 700, which may be computed as the sum of all edge delays along the path 700. Conversely, the path's "complement path slack" is defined as the maximum delay among all paths in the timing graph 702 except for the path 700. As illustrated further in FIGS. 8 and 9, the complement path slack is not directly computed, since it is expensive to compute.

Figure 8:
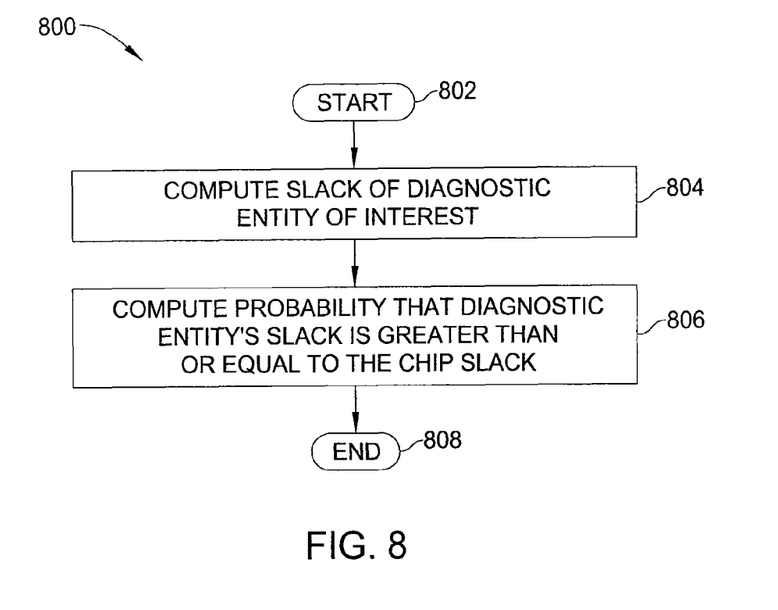
FIG. 8 is a flow diagram illustrating one embodiment of a method for computing the criticality of a diagnostic entity.

FIG. 8 is a flow diagram illustrating one embodiment of a method 800 for computing the criticality of a diagnostic entity (e.g., in accordance with step 312 of the method 300).

The method 800 is initialized at step 802 and proceeds to step 804, where the method 800 computes the diagnostic entity's slack (i.e., node, edge, or path slack), as specified by step 310 of the method 300. Embodiments of methods for computing node slack, edge slack, and path slack are described above with reference to FIGS. 5, 6, and 7.

In step 806, the method 800 computes the probability that the diagnostic entity's slack is greater than or equal to the circuit's chip slack. This probability is equal to the diagnostic entity's criticality. The justification for step 806 is illustrated as follows for the case of node criticality; the arguments for edge criticality and path criticality are similar:

$$\begin{aligned}\text{Node criticality} &= \text{probability (maximum delay of all paths} \\ &\quad \text{through node} \geq \text{maximum delay of all paths not} \\ &\quad \text{through node)} \\ &= \text{probability (node slack} \geq \text{complement} \\ &\quad \text{node slack)} \\ &= \text{probability (node slack} \geq \text{complement node} \\ &\quad \text{slack, and node slack} \geq \text{node slack)} \\ &= \text{probability (node slack} \geq \text{maximum(complement} \\ &\quad \text{node slack, node slack))} \\ &= \text{probability (node slack} \geq \text{chip slack)}\end{aligned}$$

Thus, node criticality can be computed from node slack and chip slack without directly computing complement node slack. The method 800 then terminates in step 808.

Figure 9:
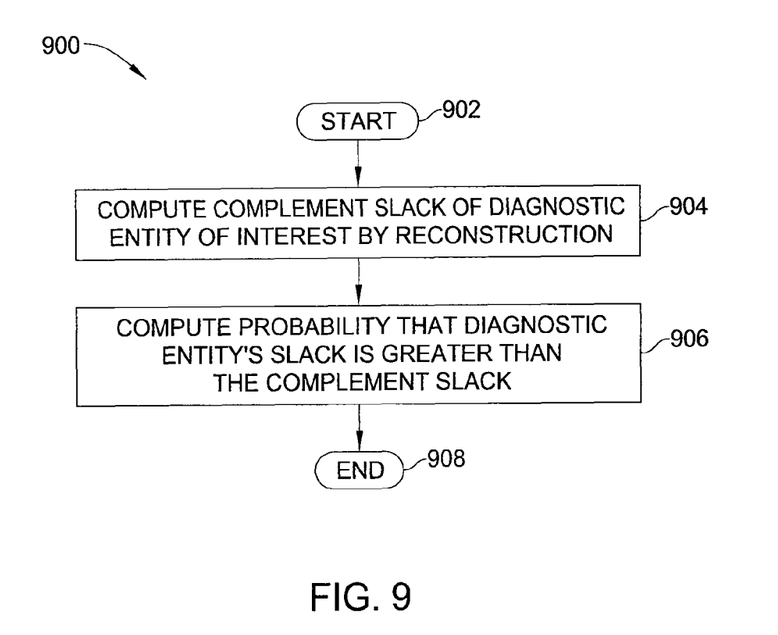
FIG. 9 is a flow diagram illustrating a second embodiment of a method for computing the criticality of a diagnostic entity.

FIG. 9 is a flow diagram illustrating a second embodiment of a method 900 for computing the criticality of a diagnostic entity (e.g., in accordance with step 312 of the method 300).

The method 900 is initialized at step 902 and proceeds to step 904, where the method 900 reconstructs the diagnostic entity's complement slack (i.e., complement node, edge, or path slack). This assumes that the diagnostic entity's slack was already computed (e.g., as in step 310 of the method 300). Embodiments of methods for computing node slack, edge slack, and path slack are described above with reference to FIGS. 5, 6, and 7.

In step 906, the method 900 computes the probability that the diagnostic entity's slack is greater than the diagnostic entity's complement slack. This probability is equal to the diagnostic entity's criticality. The justification for step 906 is illustrated as follows for the case of node criticality; the arguments for edge criticality and path criticality are similar:

$$\begin{aligned}\text{Chip slack} &= \text{maximum (statitical maximum of delay of all paths} \\ &\quad \text{through node, statistical maximum of delay of all} \\ &\quad \text{paths not through node)} \\ &= \text{max (node slack, complement node slack)}\end{aligned}$$

In the above equations, chip slack and the diagnostic entity's slack are known. Using algebraic manipulation, complement slack for the diagnostic entity can be reconstructed, especially in the case where timing quantities are represented by a first-order canonical linear form. Once this is done, the probability that the diagnostic entity's slack exceeds the diagnostic entity's complement slack is the required criticality.

In one embodiment, the diagnostic entity's complement slack, B, is reconstructed by solving the equation:

$$C = \max(A, B) \quad \quad \text{(EQN. 4)}$$

where C, the chip slack, and A, the diagnostic entity's slack, are known.

Under the linear parameterized delay model described, for example, by Visweswariah in U.S. patent application Ser. No. 10/665,092, filed Sep. 18, 2003 (titled "System and Method for Statistical Timing Analysis of Digital Circuits"), which is herein incorporated by reference in its entirety, the chip slack, C, may be represented as:

$$C = c_0 + \sum_{i=1}^{N} c_i X_i + c_r X_c \quad \text{(EQN. 5)}$$

where $c_0$ is the mean value of the chip slack, C, $X_i$ models the N process parameters following a standard Gaussian distribution, $X_c$ models uncorrelated random variation (which also follows a standard Gaussian distribution), and $c_i$ and $c_r$ are the sensitivities of the chip slack, C, to the corresponding random variables. The variance of the chip slack, C, is then give by:

$$\sigma_C^2 = \sum_{i=1}^{N} c_i^2 + c_r^2 \quad \text{(EQN. 6)}$$

Similarly, the diagnostic entity's slack, A, and the and the diagnostic entity's complement slack, B, can be represented as:

$$A = \alpha_0 + \sum_{i=1}^{N} \alpha_i X_i + \alpha_r X_a \quad \text{(EQN. 7)}$$

and $$B = \beta_0 + \sum_{i=1}^{N} \beta_i X_i + \beta_r X_b \quad \text{(EQN. 8)}$$

The covariance of the diagnostic entity's slack, A, and the diagnostic entity's complement slack, B, is then given by:

$$\text{cov}(A, B) = \sum_{i=1}^{N} \alpha_i \beta_i \quad \text{(EQN. 9)}$$

The correlation coefficient, $\rho_{AB}$, for of the diagnostic entity's slack, A, and the diagnostic entity's complement slack, B, is:

$$\rho_{AB} = \frac{\text{cov}(A, B)}{\sigma_A \sigma_B} \quad \text{(EQN. 10)}$$

where $\sigma_A^2$ and $\sigma_B^2$ are the variances of the diagnostic entity's slack, A, and the diagnostic entity's complement slack, B, respectively.

The tightness probability, t, of the diagnostic entity's slack, A, is given by:

$$t = P(A \geq B) = \Phi\left[\frac{\alpha_0 - \beta_0}{\theta}\right] \quad \text{(EQN. 11)}$$

where $\Phi[x]$ is the standard Gaussian cumulative distribution function (CDF) and $$\theta = \{\sigma_A^2 + \sigma_B^2 - 2\rho_{AB}\sigma_A\sigma_B\}^{1/2} \quad \text{(EQN. 12)}$$

The computation of the chip slack in the form of EQN. 5 is given by:

$$c_0 = \alpha_0 t + \beta_0(1-t) + \theta\phi\left[\frac{\alpha_0 - \beta_0}{\theta}\right] \quad \text{(EQN. 13)}$$

$$c_i = \alpha_i t + \beta_i(1-t) \quad \text{(EQN. 14)}$$

$$c_r = \left(\sigma_c^2 - \sum_{i=1}^{N} c_i^2\right)^{1/2} \quad \text{(EQN. 15)}$$

where the variance of the chip slack is given by:

$$\sigma_C^2 = \quad \text{(EQN. 16)}$$
$$(\sigma_A^2 + \alpha_0^2)t + (\sigma_B^2 + \beta_0^2)(1-t) + (\alpha_0 + \beta_0)\theta\phi\left[\frac{\alpha_0 - \beta_0}{\theta}\right] - c_0^2$$

and where $\phi[x]$ is the standard Gaussian probability density function (PDF).

It is known that the tightness probability, t, for computing chip slack, C, is the same as the diagnostic entity's criticality. Since the chip slack, C, and the diagnostic entity's slack, A, can be computed incrementally, the tightness probability, t, can be computed from the diagnostic entity's slack, A, and the chip slack, C, directly (rather than from the diagnostic entity's slack, A, and the diagnostic entity's complement slack, B).

According to EQN. 14, one has:

$$\beta_i = \frac{c_i - t\alpha_i}{1-t} \quad \text{(EQN. 17)}$$

Substituting EQN. 17 into EQN. 9, and noting that $$\text{cov}(A, C) = \sum_{i=1}^{N} \alpha_i c_i,$$

one has, after some simplification:

$$\frac{t\sigma_A + (1-t)\rho_{AB}\sigma_B}{\sigma_C} - t\frac{\alpha_r^2}{\sigma_A \sigma_C} = \rho_{AC} \quad \text{(EQN. 18)}$$

where $\rho_{AC}$ is the correlation coefficient between the diagnostic entity's slack, A, and the chip slack, C.

Based on EQNs. 11 and 12, it is known that:

$$\rho_{AB}\sigma_B = \frac{\sigma_A^2 + \sigma_B^2 - \theta^2}{2\sigma_A} \quad \text{(EQN. 19)}$$

$$\theta = \frac{\alpha_0 - \beta_0}{\Phi^{-1}(t)} \quad \text{(EQN. 20)}$$

and $$\phi\left[\frac{\alpha_0 - \beta_0}{\theta}\right] = \phi[\Phi^{-1}(t)] \quad \text{(EQN. 21)}$$

Substituting EQNs. 19-21 into EQNs. 13 and 17 gives, after some simplification:

$$\beta_0 = \frac{c_0 - t\alpha_0 - \alpha_0 \frac{\phi[\Phi^{-1}(t)]}{\Phi^{-1}(t)}}{1 - t - \frac{\phi[\Phi^{-1}(t)]}{\Phi^{-1}(t)}} \quad \text{(EQN. 22)}$$

and $$\sigma_B^2 = \frac{2(t\sigma_r^2 + \sigma_A \sigma_C \rho_{AC} - t\sigma_A^2)}{1-t} + \left(\frac{\alpha_0 - \beta_0}{\Phi^{-1}(t)}\right)^2 - \sigma_A^2 \quad \text{(EQN. 23)}$$

After substituting EQNs. 20-23 into EQN. 16, the only remaining unknown in EQN. 16 is the tightness probability, t. The resulting equation can thus be solved for the tightness probability, t, by any standard root-finding technique. Since this is a one-dimensional root-finding problem, and since the range of the tightness probability, t, is between zero and one, the computation of the tightness probability, t, becomes relatively straightforward. As stated above, it is known that the tightness probability, t, for computing chip slack, C, is the same as the diagnostic entity's criticality. Thus, knowing the diagnostic entity's slack, A, and the chip slack, C, the diagnostic entity's criticality can be solved in constant time by solving a simple one-dimensional root-finding problem (for tightness probability, t). By constant time, it is implied that this computation can be conducted in computer time that is independent of the size of the chip design.

The method 900 terminates in step 908.

The methods 800 and 900 are alternative methods of computing criticalities, and may be used advantageously depending on the requirements and circumstances. For example, the method 800 is a general technique that applies to substantially all variational delay models (e.g., linear or nonlinear, Gaussian or non-Gaussian). Although the method 900 applies only to linear Gaussian delay models, in the presence of approximations in the underlying statistical timing, the method 900 can produce more accurate results.

As discussed with reference to FIG. 3, the yield gradients can also be computed incrementally from incremental calculations of the diagnostic entity slack and chip slack. For illustration, the gradient of yield with respect to an edge's delay is described below. In a similar manner, the gradient of either yield or frequency with respect to an edge, a node, or a path of the timing graph can be computed. The yield, Y, of a chip can be described as a function of the chip slack, i.e., $Y=f(\overline{C})$, where $\overline{C}$ is the chip slack. As such, the yield gradient of a chip with respect to the delay, $\overline{d}$, of a diagnostic entity can be computed as:

$$\frac{\partial Y}{\partial \overline{d}} = \frac{\partial Y}{\partial \overline{C}} \cdot \frac{\partial \overline{C}}{\partial \overline{A}} \cdot \frac{\partial \overline{A}}{\partial \overline{d}} \quad \text{(EQN. 24)}$$

where $\overline{C}=(c_0, c_1, \ldots, c_n, c_r)=f(\overline{C})$ is the vector form of the first-order canonical form of the chip slack, $\overline{C}$, and $\overline{A}=(\alpha_1, \alpha_2, \ldots, \alpha_n, \alpha_r)$ is the vector form of a diagnostic entity's slack, A.

The yield, Y, can then be further represented as a function of $\overline{C}$ as:

$$Y=f(\overline{C})=f(c_0, c_1, \ldots, c_n, c_r) \quad \text{(EQN. 25)}$$

$$\frac{\partial Y}{\partial \overline{C}}$$

is easy to compute from EQN. 5 by analytical differentiation.

$$\frac{\partial \overline{A}}{\partial \overline{d}}$$

can be computed from the diagnostic entity's slack, as discussed with respect to FIGS. 5, 6, and 7. The only remaining computation for yield gradient is then the gradient of the chip slack with respect to diagnostic entity slack, or $$\frac{\partial \overline{C}}{\partial \overline{A}}.$$

For any diagnostic entity of interest, chip slack, $\overline{C}$, can be computed as the statistical maximum of the diagnostic entity's slack, $\overline{A}$, and complement slack, $\overline{B}$. Thus, chip slack, $\overline{C}$, can be written as:

$$\overline{C}=\max(\overline{A},\overline{B})=\overline{F}(\overline{A},\overline{C}) \quad \text{(EQN. 26)}$$

where $\overline{F}$ is the statistical maximum operation. Differentiation on EQN. 6 gives:

$$\frac{\partial \overline{C}}{\partial \overline{A}} = \frac{\partial \overline{F}}{\partial \overline{A}} + \frac{\partial \overline{F}}{\partial \overline{C}} \frac{\partial \overline{C}}{\partial \overline{A}} \quad \text{(EQN. 27)}$$

The gradient of the chip slack is then:

$$\frac{\partial \overline{C}}{\partial \overline{A}} = \left(I - \frac{\partial \overline{F}}{\partial \overline{C}}\right)^{-1} \cdot \frac{\partial \overline{F}}{\partial \overline{A}} \quad \text{(EQN. 28)}$$

where I is an (n+2)×(n+2) identity matrix. The solution to EQN. 28 can then be substituted into EQN. 24 to obtain the chip's yield gradient.

In another embodiment, the yield gradient for a chip can be computed analytically in constant time from the complement slack for a diagnostic entity, as discussed, for example, in U.S. patent application Ser. No. 11/358,622, filed Feb. 21, 2006, which is herein incorporated by reference in its entirety.

Figure 10:
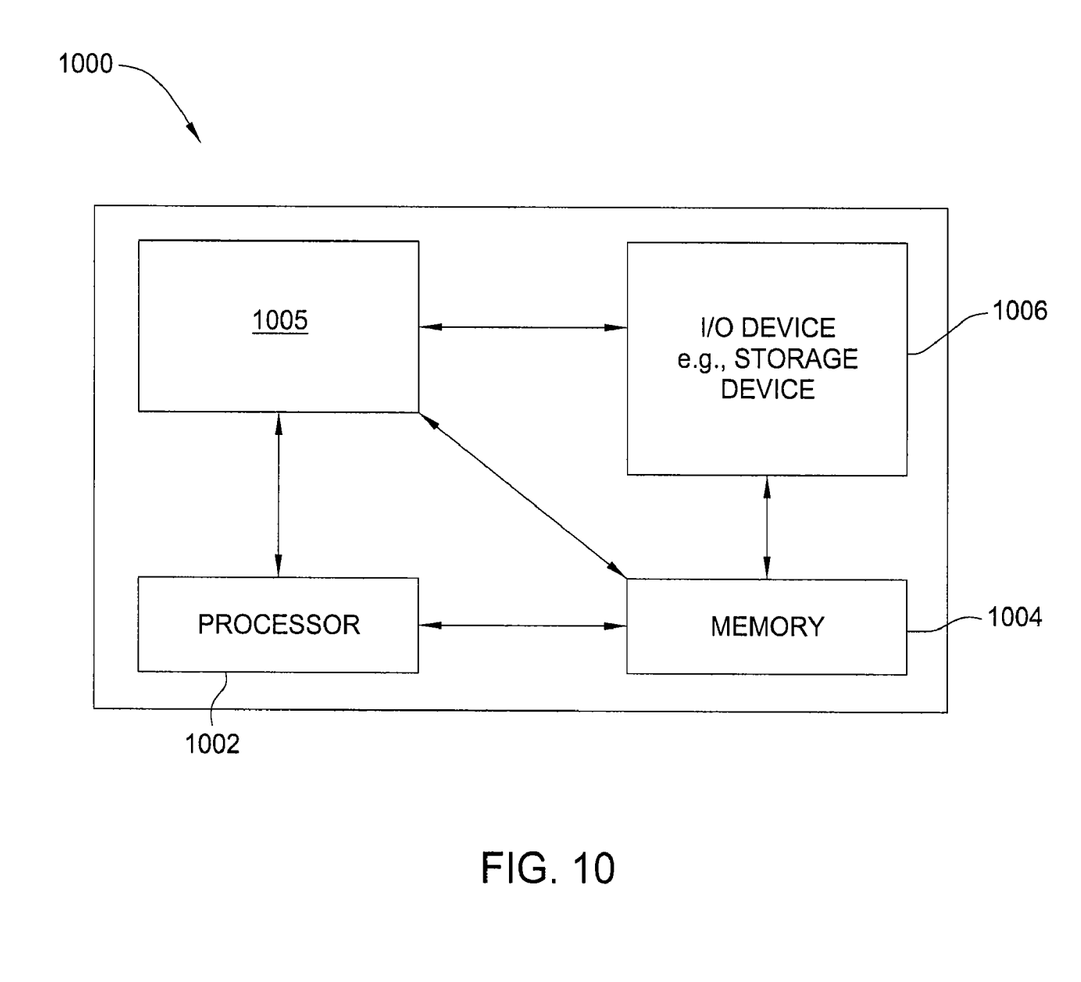
FIG. 10 is a high-level block diagram of the criticality and yield gradient computation method that is implemented using a general purpose computing device.

FIG. 10 is a high-level block diagram of the criticality and yield gradient computation method that is implemented using a general purpose computing device 1000. In one embodiment, a general purpose computing device 1000 comprises a processor 1002, a memory 1004, a criticality and yield gradient computation module 1005 and various input/output (I/O) devices 1006 such as a display, a keyboard, a mouse, a stylus, a wireless network access card, and the like. In one embodiment, at least one I/O device is a storage device (e.g., a disk drive, an optical disk drive, a floppy disk drive). It should be understood that the criticality and yield gradient computation module 1005 can be implemented as a physical device or subsystem that is coupled to a processor through a communication channel.

Alternatively, the criticality and yield gradient computation module 1005 can be represented by one or more software applications (or even a combination of software and hardware, e.g., using Application Specific Integrated Circuits (ASIC)), where the software is loaded from a storage medium (e.g., I/O devices 1006) and operated by the processor 1002 in the memory 1004 of the general purpose computing device 1000. Thus, in one embodiment, the criticality and yield gradient computation module 1005 for computing the criticality and yield gradient of a diagnostic entity, as described herein with reference to the preceding Figures can be stored on a computer readable storage medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. A method for computing a diagnostic metric for a circuit, the method comprising:
    modeling the circuit as a timing graph;
    determining a chip slack for the circuit;
    determining a slack of at least one of a plurality of diagnostic entities in the circuit; and
    computing a diagnostic metric relating to the at least one of the plurality of diagnostic entities directly from the chip slack and the slack of the at least one of the plurality of diagnostic entities,
    wherein at least one of: the modeling, the determining the chip slack, the determining the slack of the at least one of the plurality of diagnostic entities, and the computing is performed using a processor.

2. The method of claim 1, wherein the diagnostic metric is criticality.

3. The method of claim 2, wherein the criticality comprises a node criticality.

4. The method of claim 2, wherein the criticality comprises an edge criticality.

5. The method of claim 2, wherein the criticality comprises a path criticality.

6. The method of claim 2, wherein the computing comprises:
    calculating a probability that the slack of the at least one of the plurality of diagnostic entities is greater than or equal to the chip slack.

7. The method of claim 2, wherein the computing comprises:
    calculating a complement slack for the at least one of the plurality of diagnostic entities; and
    calculating a probability that the slack of the at least one of the plurality of diagnostic entities is greater than the complement slack of the at least one of the plurality of diagnostic entities.

8. The method of claim 1, wherein the computing is performed in substantially constant time.

9. The method of claim 1, wherein the computing comprises:
    differentiating the chip slack with respect to a slack of the at least one of the plurality of diagnostic entities to obtain a yield gradient of the at least one of the plurality of diagnostic entities.

10. The method of claim 1, wherein the chip slack and the slack of the at least one of the plurality of diagnostic entities is obtained by incremental timing.

11. The method of claim 1, wherein the computing is performed in accordance with statistical static timing analysis.

12. The method of claim 11, wherein the statistical static timing analysis is used to compute at least one of: arrival times and required arrival times for the plurality of diagnostic entities, as represented in the timing graph.

13. A non-transient computer readable storage medium containing an executable program for computing a diagnostic metric for a circuit, where the program performs steps of:
    modeling the circuit as a timing graph;
    determining a chip slack for the circuit;
    determining a slack of at least one of a plurality of diagnostic entities in the circuit; and
    computing a diagnostic metric relating to the at least one of the plurality of diagnostic entities directly from the chip slack and the slack of the at least one of the plurality of diagnostic entities.

14. The non-transient computer readable storage medium of claim 13, wherein the diagnostic metric is criticality.

15. The non-transient computer readable storage medium of claim 14, wherein the computing comprises:
    calculating a probability that the slack of the at least one of the plurality of diagnostic entities is greater than or equal to the chip slack.

16. The non-transient computer readable storage medium of claim 14, wherein the computing comprises:
    calculating a complement slack for the at least one of the plurality of diagnostic entities; and
    calculating a probability that the slack of the at least one of the plurality of diagnostic entities is greater than the complement slack of the at least one of the plurality of diagnostic entities.

17. The non-transient computer readable storage medium of claim 13, wherein the computing comprises:
    differentiating the chip slack with respect to a slack of the at least one of the plurality of diagnostic entities to obtain a yield gradient of the at least one of the plurality of diagnostic entities.

18. The non-transient computer readable storage medium of claim 13, wherein the computing is performed in accordance with statistical static timing analysis.

19. Apparatus for computing a diagnostic metric for a circuit comprising a plurality of diagnostic entities, the apparatus comprising:
    means for modeling the circuit as a timing graph;
    means for determining a chip slack for the circuit;
    means for determining a slack of at least one of a plurality of diagnostic entities in the circuit; and
    means for computing a diagnostic metric relating to the at least one of the plurality of diagnostic entities directly from the chip slack and the slack of the at least one of the plurality of diagnostic entities.

20. A method for computing a diagnostic metric for a diagnostic entity in a circuit, where the diagnostic metric is based on one or more values for statistical timing results relating to a plurality of diagnostic entities in the circuit, the method comprising:

receiving a diagnostic query after one or more changes are made to the circuit, the diagnostic query relating to the diagnostic entity, where the diagnostic entity has been changed since a last time the diagnostic metric was computed; and incrementally re-computing the diagnostic metric using one or more updated statistical timing result values obtained by updating only those of the one or more values that related to those of the plurality of diagnostic entities that have changed since the last time the diagnostic metric was computed, wherein at least one of: the receiving and the computing is performed using a processor.

21. A non-transient computer readable storage medium containing an executable program for computing a diagnostic metric for a diagnostic entity in a circuit, where the diagnostic metric is based on one or more values for statistical timing results relating to a plurality of diagnostic entities in the circuit, where the program performs steps of:

receiving a diagnostic query after one or more changes are made to the circuit, the diagnostic query relating to the diagnostic entity, where the diagnostic entity has been changed since a last time the diagnostic metric was computed; and incrementally re-computing the diagnostic metric using one or more updated statistical timing result values obtained by updating only those of the one or more values that related to those of the plurality of diagnostic entities that have changed since the last time the diagnostic metric was computed.

* * * * *